July 19, 1960 A. PANAGROSSI ET AL 2,945,773
LAMINATION OR COATING OF FLUORINE-SUBSTITUTED
POLYETHYLENES WITH OR ON OTHER SUBSTANCES
Filed March 14, 1955

INVENTORS
AHMED PANAGROSSI,
RAY L. HAUSER
FRANCIS C. FUSCO

BY

ATTORNEYS

United States Patent Office 2,945,773
Patented July 19, 1960

2,945,773

LAMINATION OR COATING OF FLUORINE-SUBSTITUTED POLYETHYLENES WITH OR ON OTHER SUBSTANCES

Ahmed Panagrossi, North Haven, Conn., Ray L. Hauser, Boulder, Colo., and Francis C. Fusco, Hamden, Conn., assignors to The Connecticut Hard Rubber Company, New Haven, Conn., a corporation of Connecticut Filed Mar. 14, 1955, Ser. No. 494,038

4 Claims. (Cl. 117—138.8)

This application is a continuation-in-part of Panagrossi and Hauser application, Serial No. 246,448, filed September 13, 1951, now abandoned.

This invention relates to the lamination or coating of certain plastics, and more specifically fluorine-substituted polyethylenes, with or on other substances, and it also deals with a method of treating these plastic substances, which have hitherto been impossible to bond to other substances, so that they can be bonded and formed into laminates or surface coatings.

Certain plastic polymers containing fluorine as a part of their composition possess extraordinary toughness and resistance to heat, cold, erosion, abrasion, solvents, weathering, and chemical attack, but by reason of the fact that they are also highly resistant to wetting by water, solvents, cements and adhesives of every known kind, it has been impossible in the past to use them in forming laminates or coatings such as mentioned above.

One of the objects of the present invention is to provide for the successful use of these fluorine-substituted polyethylenes in the production of laminates and coatings.

Another object is to provide new methods and products involving fluorine-substituted polyethylenes as laminating layers or coatings.

A further object of the invention is to provide a fluorine-substituted polyethylene plastic having fixed on one of its surfaces an adhesive layer containing rubber.

Another object is to form a primed fluorine-substituted polyethylene body suitable for laminating to other surfaces or as a base for pressure-sensitive adhesive compositions.

Figure 1:
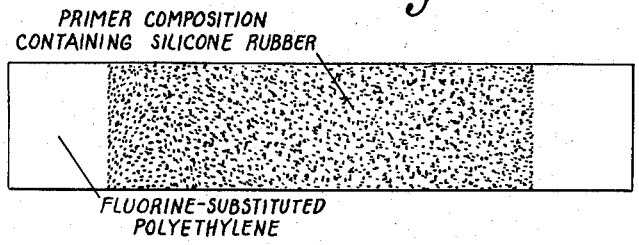
Fig. 1 is a plan view showing a fluorine-substituted polyethylene body having a surface primed in accordance with the present invention.

The property of high resistance to solvents and destructive agents is characteristic of polymerized organic fluorine compounds, and more especially fluorine-substituted polyethylene. For example, tetrafluoro-ethylene, in other words, $CF_2=CF_2$, yields the polymer known commercially under the trademark "Teflon," which is a product of E. I. du Pont de Nemours & Co. Similarly fluorine-and-chlorine-substituted ethylene, in other words, trifluoro-monochloro-ethylene, having the formula $CF_2=CFCl$, when polymerized, yields the commercial product known under the trademark "Kel-F," which is manufactured by M. W. Kellogg Co. While these two plastics differ from each other in some ways, they both possess the advantageous characteristics mentioned above, and both offer the same resistance to bonding by ordinary methods and adhesives. An object of the present invention is to overcome the resistance to bonding offered by these and similar fluorine-substituted polyethylenes.

In the following description, the trademark names of the plastics in question are used in some places for brevity's sake.

As will appear from the following description, the present method of bonding these plastics to other substances comprises in one aspect the steps of forming an intimate mixture of the plastic, in finely divided form, with a silicone or hydrocarbon rubber, also finely comminuted, and fusing this mixture on a clean surface of the plastic material prior to its use as a laminate, coating or covering. In this way a layer of intimately mixed plastic and elastomer is formed, which is strongly adherent to the plastic and possesses adhesive properties which permit it to be cemented by the usual adhesives to a layer of elastomer or metal in the ordinary way. In another aspect, the invention comprises forming a coating composition containing a silicone or hydrocarbon rubber and fusing said composition to a clean surface of a fluorine-substituted polyethylene plastic.

The procedure involved in carrying out the invention will be made clear by the following examples:

EXAMPLE 1

A paste was prepared from 173.7 grams of a dispersion of "Kel-F" particles in xylene (the dispersion containing approximately 20% solids whose particle size was approximately 0.1 to 3.0 microns) and 48 grams of silicone adhesive. The particular silicone adhesive employed was that manufactured by Connecticut Hard Rubber Company under the designation "Cohrlastic 251," the same being a partially cured rubber compound having a silicone base, the partial cure being effected by heat. This adhesive contains as a curing agent benzoyl peroxide and as a filler titanium dioxide. Specific gravity is 1.49. After stirring this mixture to insure uniformity, a small amount of the paste was brushed onto a surface of a clean sheet of "Kel-F." The coated sheet was then placed on an aluminum screen in an oven provided with air circulation and held at 450° F. for fifteen minutes. When cooled to room temperature, the sheet had shrunk slightly, but otherwise its physical properties appeared to be unchanged. The surface coating, about 0.002 inch thick, was found to be fused so tightly to the sheet that it could not be scraped off. The same silicone adhesive, "Cohrlastic 251," was then used to bond to this primed surface a sheet of fully cured silicone rubber, and after properly curing the adhesive (heating for ten minutes at 300° F. under a pressure of 400 pounds per square inch) a strong bonding was provided. "Silicone rubber" is a term well known in the art and that referred to here is a heat-cured compound containing a high-molecular-weight polysiloxane which is essentially a dimethyl silicone polymer, a suitable filler, and a suitable curing agent such, for example, as benzoyl peroxide. Peel tests of one inch strips of the composite sheet or laminate indicated a strength as great as 4.5 pounds per inch width. Tests showed that failure of the bond occurred within the layer of silicone adhesive but not at the primed surface of the plastic sheet. The strength of the bond of the same adhesive to untreated surfaces of "Kel-F" is about 1.5 pounds per inch width, and failure occurs at the interface.

Figure 3:
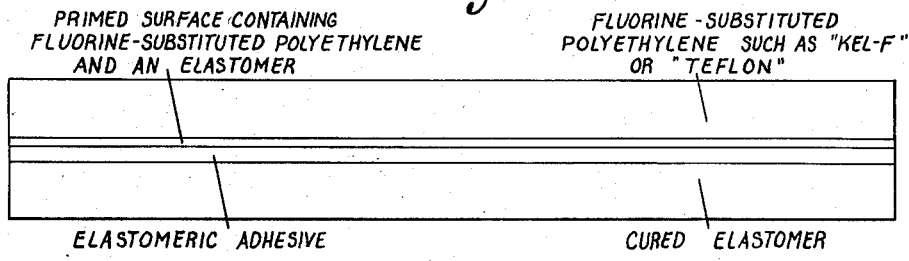
Fig. 3 is a diagrammatic view showing the application of a layer of fluorine-substituted polyethylene to an elastomeric layer.
Figure 4:
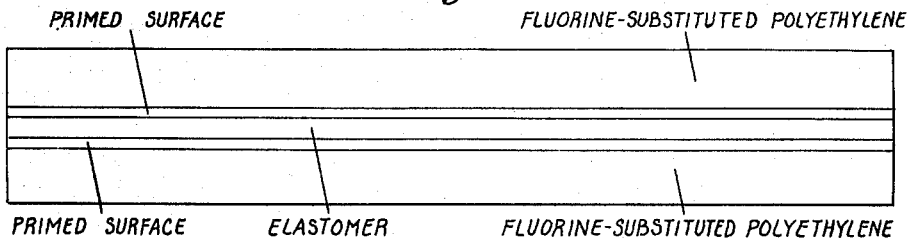
Fig. 4 is a diagrammatic view showing layers of fluorine-substituted polyethylene with an interposed layer of elastomer.
Figure 5:
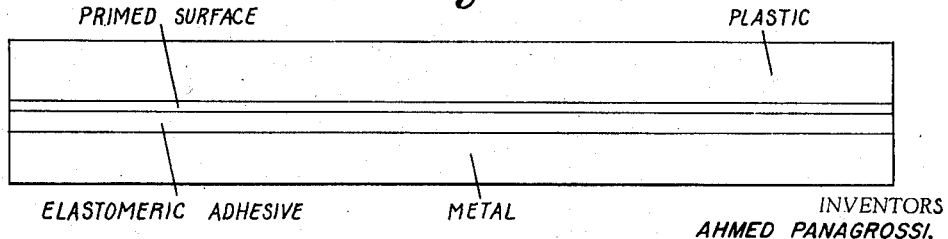
Fig. 5 is a view showing the application of a layer or coating of the plastic to a layer of metal.

The laminate formed as above described is shown in Fig. 3 of the drawing.

As a modification of this procedure, uncured silicone rubber was calendered directly onto a surface of "Kel-F" that had been primed as above described, and the next step was the curing of the silicone rubber using standard procedures. The strength of the resulting bond between the silicone rubber and the "Kel-F" sheet was as great as 11.8 pounds per inch width, and a number of samples averaged about 9.5. When the same silicone rubber was applied to and cured on an untreated surface of the same plastic, the resulting bond strength was virtually zero.

The same method we have found may be used in bonding the plastic with hydrocarbon rubbers instead of silicone rubbers if the heating period is reduced from fifteen minutes to ten minutes.

EXAMPLE 2

A priming paste was prepared from 67.2 grams of a dispersion in xylene containing approximately 27% "Kel-F" and 12.9 grams of an uncured silicone rubber. This paste was used as in Example 1, and provided upon the plastic sheet a surface which was almost as adhesive as the paste of Example 1, and could be used for the same purposes.

Using the method described in Examples 1 and 2, and replacing the silicone rubber with various kinds of hydrocarbon rubber, we have bonded "Kel-F" to the rubber with interesting and useful results, as shown in the following table:

Table 1
STRENGTH OF BOND BETWEEN "KEL-F" AND HYDROCARBON RUBBERS

| Elastomer | Percent "Kel-F" in the paste | Temperature of Fusion, °F. | Time of Fusion, min. | Strength of bond between "Kel-F" and Elastomer, lb./inch |
| --- | --- | --- | --- | --- |
| Natural rubber | 50 | 450 | 10 | 4.3 |
| Hycar OR-25 | 70 | 450 | 10 | 0.5 |
| GR-S | 60 | 450 | 10 | 2.5 |
| Neoprene | 70 | 450 | 10 | 1.3 |
| "Butyl" rubber | 50 | 450 | 10 | 11.2 |
| C-251 Cement | 0 | 460 | 6 | |

With reference to this table, "Hycar OR-25" is a synthetic rubber containing a copolymer of butadiene and acrylonitrile; "GR-S" is a synthetic rubber containing a copolymer of butadiene and styrene; "neoprene" is a synthetic rubber containing a chloroprene polymer; and "butyl" rubber is a synthetic rubber containing a copolymer of isobutylene and isoprene or a copolymer of isobutylene and butadiene.

EXAMPLE 3

Figure 2:
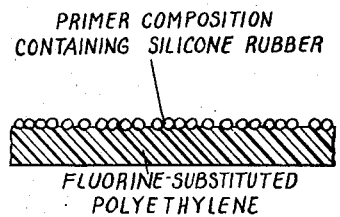
Fig. 2 is a sectional view of the body shown in Fig. 1.

To 2.5 grams of 20% solution of natural rubber in benzene was added 2.35 grams of a 50% dispersion of "Teflon" (polytetrafluoro-ethylene) in water. The mixture, which was 70% "Teflon," and contained a small amount of nonionic wetting agent known as "Triton R-100" to promote emulsification, was stirred slightly to promote uniformity, and then was brushed onto clean sheets of "Teflon" as a composite layer and dried at room temperature. "Triton R-100" is a wetting and dispersing agent which is a product of Rohm and Haas Company. The primed sheets were placed on an aluminum screen in an oven heated by radiant heat, and the composite layer was fused by application of 715° F. for three minutes. The treated primed surface was cleaned of the loose carbon formed during heating, and a thin coat of 20% solution of natural rubber in benzene was brushed on the surface. Two sheets thus prepared were laminated to an intermediate layer of uncured natural rubber, as shown in Fig. 2 of the drawing, and this rubber layer was then vulcanized to the "Teflon" by application for fifteen minutes of 310° F. and 3,500 pounds per square inch pressure.

Peel tests of the finished laminate indicated a bond strength of 3.2 pounds per inch between the rubber core and the "Teflon" sheath.

Using the method given in the next previous example, other elastomers were bonded to "Teflon," with the results shown in the following table:

Table 2
STRENGTH OF BOND BETWEEN "TEFLON" AND HYDROCARBON AND SILICONE RUBBERS

| Elastomer | Percent "Teflon" | Temperature of Fusion, degrees fahrenheit | Time of Fusion, minutes | Bond Strength lb./inch |
| --- | --- | --- | --- | --- |
| Silicone Rubber (in CCl₄) | 40 | 700 | 5 | 9.8 |
| "Butyl" Rubber (in benzene) | 50 | 715 | 3 | 3.1 |
| GR-S (in benzene) | 50 | 715 | 3 | 0.8 |
| Hycar OR-25 (in benzene) | 60 | 715 | 3 | 1.4 |
| Natural rubber (in benzene) | 40 | 715 | 3 | 3.3 |
| Neoprene (in toluene) | 70 | 715 | 3 | 0.5 |
| C-251 cement | 0 | 700 | 20 | |

From this table it may be observed that the bond strength of the silicone rubber with "Teflon" is notable. A laminate of "Teflon" and silicone rubber possesses, in addition to flexibility, excellent chemical resistance and temperature stability over the range of −70° F. to +400° F.

C-251 cement is a silicone rubber composition of The Connecticut Hard Rubber Company, known also as Cohrlastic-251, having approximately the following composition:

100 parts silicone gum SF-69, General Electric Co.'s viscosity 2600 cps.
0.2 part ferric chloride
120 parts titanium dioxide
0.2 part stearic acid
12 parts benzoyl peroxide A composition was formulated by adding the ferric chloride slowly to the silicone gum at a temperature of 70° C., the temperature raised to 125° C. and held until the viscosity reaches approximately 2000 cps., which takes about thirty minutes. The titanium dioxide was then added and the mixture heated at the same temperature for an additional thirty minutes, then cooled and the benzoyl peroxide added.

A thin film of the silicone rubber cement was sprayed onto the surface of the polytetrafluoroethylene tape and allowed to dry at room temperature. The silicone rubber-coated tape was then introduced into a continuous 10 foot oven at the rate of 25 feet per hour, heated to a temperature of approximately 725° F. This temperature was found to sufficiently soften or fuse the surface of the Teflon plastic to integrate or interfuse the silicone rubber coating with the surface of the tape.

A modification of the procedures described above consists in securing a bonding layer by applying a dispersion of "Teflon" to the "Teflon" sheet first, and then applying a solution of the desired elastomer as described in the following example:

EXAMPLE 4

A 50% dispersion of "Teflon" particles in water was brushed onto two clean sheets of "Teflon." These sheets were then dried at room temperature. Then a solution of 14.5% "butyl" rubber in benzene was brushed on and dried, and the sheets again dried at room temperature. The composite layer containing particles of the two substances was then fused in a radiant-heat oven by application of 715° F. for three minutes.

After cleaning off the loose carbon formed on the surfaces, fresh "butyl" rubber was calendered onto the primed surfaces of the two sheets to form a laminate. Then the laminate was vulcanized by application of 310° F. and pressure of 6,000 pounds per square inch for thirty minutes.

Bond strength between the "Teflon" sheath and the

"butyl" rubber core was found by the peel test to be 3.6 pounds per inch.

Using the same procedure, natural rubber was laminated to "Teflon" with a bond strength of 3.3 pounds per inch, and neoprene was laminated to "Teflon" with a bond strength of 1.5 pounds per inch.

EXAMPLE 5

In this example, it is shown that adhesion between the fluorocarbon sheet and the rubber slab can be obtained even though the fluorocarbon is omitted from the priming mixture.

An 8% dispersion of unvulcanized natural rubber compound in carbon tetrachloride was brushed on the surface of a "Kel-F" sheet. The solvent was removed by drying at room temperature. The primed "Kel-F" sheet was then heated at a temperature of 480° F. for ten minutes, during which time the natural rubber compound attached itself to the "Kel-F" film. After cooling to room temperature, the primed "Kel-F" film was pressed against a slab of compounded unvulcanized natural rubber with a curable natural rubber cement between, and the laminate was vulcanized under heat and pressure for thirty minutes at 285° F.

Upon testing the above laminate, it was found that the "Kel-F" film adhered to the natural rubber with a force of 1.50 pounds per inch when the "Kel-F" strip was peeled at an angle of 180°. This result was approximately one-third of the adhesion value found when a 50:50 mixture of "Kel-F" powder and natural rubber compound was used in the primer, but it proves that the most essential ingredient of the primer is the natural rubber itself.

EXAMPLE 6

A similar experiment was carried out in which "Teflon" film was substituted for the "Kel-F" film used in Example 5. The "Teflon" film was approximately four mils thick and the priming treatment was carried out for twenty minutes at 725° F. during which time the natural rubber decomposed partially, but tended to penetrate and attach itself to the "Teflon" film. After the natural rubber slab was cured against the "Teflon" film under heat and pressure, adhesion tests were carried out which showed that the peel strength was approximately 1.5 pounds per inch. When 10% of the rubber in the primer was replaced by "Teflon" particles, the adhesion was about 2.2 pounds per inch, and when rubber and "Teflon" were present in 50:50 mixture in the primer, the adhesion was 1.7 pounds per inch. These data also indicate that the essential ingredient of the priming mixture is the rubber itself, rather than the Teflon plastic.

EXAMPLE 7

In another series of tests, the adhesion of silicone rubber to a primed "Teflon" film was tested with varying percentages of "Teflon" and silicone in the primer solution. A 15% dispersion of "Cohrlastic 251" (a silicone rubber adhesive) in carbon tetrachloride was brushed on the surface of a 4 mil "Teflon" film. After removing the solvent by drying, the film was baked for twenty minutes at 725° F. The silicone rubber appeared to penetrate and attach itself to the "Teflon" film. This film was then superimposed on the surface of unvulcanized silicone rubber containing vulcanizing ingredients. A thin coating of fresh "Cohrlastic C-251" cement was applied as a cement between the rubber and the primed "Teflon" surface. After curing for fifteen minutes at 250° F., and cooling to room temperature, adhesion tests were carried out as described above. In this case in which the primer contained no "Teflon" dispersion, the adhesive strength was 3.2 pounds per inch.

In a supplementary experiment in which 10% of "Teflon" powder was used in the primer along with 90% of C-251 adhesive adhesive, the peel strength was 2.5 pounds per inch.

In a third example in which the two ingredients of the primer were present in equal quantities, the peel strength was 2.1 pounds per inch. The data again indicates that the essential ingredient of the primer was the silicone rubber.

What we claim is:

1. A product comprising a fluorine-substituted polyethylene plastic selected from the group consisting of tetrafluoroethylene and trifluoro-monochloro-ethylene, said plastic having fused to at least a portion of its surface particles of the fluorine-substituted polyethylene plastic and particles of silicone rubber.

2. A fluorine-substituted polyethylene body having fused to one of its surfaces a priming composition containing silicone rubber.

3. The method of rendering bondable the surface of a fluorine-substituted polyethylene, which comprises applying to the surface of the fluorine-substituted polyethylene a priming composition containing silicone rubber and fusing said priming composition to the surface of the fluorine-substituted polyethylene.

4. A fluorine-substituted polyethylene body having fused to one of its surfaces a priming composition containing silicone rubber and particles of a fluorine-substituted polyethylene.

References Cited in the file of this patent

UNITED STATES PATENTS

| | | |
|---|---|---|
| 2,484,484 | Berry | Oct. 11, 1949 |
| 2,601,337 | Smith-Johannsen | June 24, 1952 |
| 2,639,276 | Smith-Johannsen et al. | May 19, 1953 |
| 2,705,691 | Panagrossi et al. | Apr. 5, 1955 |

FOREIGN PATENTS

| | | |
|---|---|---|
| 660,398 | Great Britain | Mar. 28, 1949 |